(12) United States Patent
Song et al.

(10) Patent No.: US 12,486,938 B2
(45) Date of Patent: Dec. 2, 2025

(54) PIPELINE INSPECTION ROBOT WITH CRISSCROSS STRUCTURE-CHANGEABLE CRAWLER BELTS AND CONTROL METHOD THEREOF

(71) Applicant: SOUTHEAST UNIVERSITY, Nanjing (CN)

(72) Inventors: Aiguo Song, Nanjing (CN); Shaohu Wang, Nanjing (CN); Huijun Li, Nanjing (CN); Tianyuan Miao, Nanjing (CN); Qinjie Ji, Nanjing (CN); Yuefeng Xu, Nanjing (CN); Bo Xu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/246,425

(22) PCT Filed: May 12, 2022

(86) PCT No.: PCT/CN2022/092373
§ 371 (c)(1),
(2) Date: Mar. 23, 2023

(87) PCT Pub. No.: WO2023/212974
PCT Pub. Date: Nov. 9, 2023

(65) Prior Publication Data
US 2024/0353049 A1  Oct. 24, 2024

(30) Foreign Application Priority Data

May 5, 2022  (CN) .......................... 202210479071.9

(51) Int. Cl.
*F16L 55/02* (2006.01)
*B62D 55/065* (2006.01)
(Continued)

(52) U.S. Cl.
CPC ............... *F16L 55/32* (2013.01); *F16L 55/40* (2013.01); *F16L 2101/30* (2013.01)

(58) Field of Classification Search
CPC ....... B62D 55/065; B62D 55/08; F16L 55/32; F16L 55/40; F16L 2101/30
See application file for complete search history.

(56) References Cited

FOREIGN PATENT DOCUMENTS

| CN | 202806930 U | * | 3/2013 | ........... B62D 55/065 |
| CN | 103672296 A |  | 3/2014 | |

(Continued)

*Primary Examiner* — Laura Martin
*Assistant Examiner* — Anthony W Megna Fuentes
(74) *Attorney, Agent, or Firm* — MUNCY, GEISSLER, OLDS & LOWE, P.C.

(57) ABSTRACT

A pipeline inspection robot with crisscross structure-changeable crawler belts includes a robot main body, crawler belt tilt angle adjustment mechanisms symmetrically provided on left and right sides of the robot main body, and crisscross structure-changeable crawler belt assemblies provided on the crawler belt tilt angle adjustment mechanisms. The robot main body is connected to the crisscross structure-changeable crawler belt assemblies at the left and right sides thereof by means of the crawler belt tilt angle adjustment mechanisms. The crawler belt tilt angle adjustment mechanisms are adjusted by means of supporting sliding blocks at the bottom of the robot main body. The crisscross structure-changeable crawler belt assembly includes a primary traveling crawler belt, an auxiliary traveling crawler belt, and a crisscross structure-changeable sliding block. The primary traveling crawler belt and the auxiliary traveling crawler belt are connected by means of the crisscross structure-changeable sliding block.

5 Claims, 16 Drawing Sheets

(51) Int. Cl.
*F16L 55/32* (2006.01)
*F16L 55/40* (2006.01)
*F16L 101/30* (2006.01)
B62D 55/08 (2006.01)

(56) References Cited

FOREIGN PATENT DOCUMENTS

| | | | | | |
|---|---|---|---|---|---|
| CN | 104881027 | A | | 9/2015 | |
| CN | 106345123 | A | * | 1/2017 | ............. A63H 13/00 |
| CN | 107289230 | A | * | 10/2017 | ............. F16L 55/40 |
| CN | 109515538 | A | | 3/2019 | |
| CN | 109571404 | A | | 4/2019 | |
| CN | 111156368 | A | * | 5/2020 | ............. F16L 55/32 |
| CN | 110939825 | B | | 2/2021 | |
| CN | 113002644 | A | | 6/2021 | |
| CN | 113002644 | B | * | 1/2022 | ............. F16L 55/40 |
| CN | 114056448 | A | | 2/2022 | |
| CN | 114165678 | A | * | 3/2022 | ............. F16L 55/40 |
| JP | 2011105029 | A | | 6/2011 | |
| JP | 2016055663 | A | | 4/2016 | |

* cited by examiner

PIPELINE INSPECTION ROBOT WITH CRISSCROSS STRUCTURE-CHANGEABLE CRAWLER BELTS AND CONTROL METHOD THEREOF

TECHNICAL FIELD

The present disclosure belongs to the technical field of robots, and in particular relates to a pipeline inspection robot with crisscross structure-changeable crawler belts and a control method thereof.

BACKGROUND

Pipeline transportation has the advantages of low cost, convenience for transportation, large transportation volume and the like, and plays an important role in many fields. However, chemical corrosion, environmental changes, natural disasters, defects of pipelines themselves and the like may all lead to accidents such as the leakage of materials and environmental pollution, so the pipelines need to be inspected continuously. But it is especially inconvenient to inspect pipelines. At present, most of inspection methods are of manual inspection, which has the disadvantages of high inspection cost, low detection rate, high labor intensity for inspection while being used for pipeline inspection in harsh environments. Traveling mechanisms often adopted by pipeline inspection robots include three types: a crawler belt type, a leg type, and a wheel type. Among them, a crawler belt type pipeline robot has a large contact area with walls and strong adaptability. Compared with a leg type pipeline robot with the disadvantages of slow movement speed and complex movement mechanism and a wheel type pipeline robot with the disadvantages of poor obstacle crossing ability and poor stability, the crawler belt type pipeline robot is the optimal traveling mechanism. Despite of this, the crawler belt type pipeline robot is only able to adapt to different types of pipelines with the adjustment of tilt angles of crawler belts and the aid of auxiliary crawler belts.

The patent document with the Chinese Patent Application No. CN202111613153.X and the date of publication of Feb. 18, 2022 discloses an assisted obstacle-crossing robot and an operating method thereof. A manner of arranging a first side vehicle body and a second side vehicle body at two ends of a middle vehicle body and using an electric cylinder to stretch is adopted for crossing over obstacles, but this mechanism is greatly influenced by ground environments, and has weak road-holding ability and poor adaptability to complex obstacle environments.

The patent document with the Chinese Patent Application No. CN201911234990.4 and the date of authorization of Feb. 5, 2021 discloses a full-automatic submarine pipeline inspection robot for marine engineering, which adopts a structure combining the wheel type and the crawler belt type to inspect within submarine pipelines. However, this structure cannot properly adjust contact positions between crawler belts and pipe walls and between traveling wheels and the pipe walls in combination with inner conditions of the pipelines, which may lead to abrasion to the crawler belts and the traveling wheels.

At present, an urgent problem urgently needed to be solved is how to enable the pipeline inspection robots to cross cover complex obstacles and adapt to pipeline environments.

SUMMARY

In view of the problems that pipeline inspection robots cannot adapt to multiple types of pipelines under narrow environments of the pipelines and flexibly cross over obstacles, the present disclosure is intended to provide a pipeline inspection robot with crisscross structure-changeable crawler belts and a control method thereof to solve the problems that road conditions are not regular enough due to impurities within the pipelines and the pipeline inspection robots cannot flexibly cross over the obstacles due to the accumulation of the impurities within the pipelines, and proposes a control method for adjustment of crawler belt tilt angles and an obstacle-crossing control method.

To achieve the above objective, the present disclosure adopts the following technical solutions:

A pipeline inspection robot with crisscross structure-changeable crawler belts includes a robot main body, crawler belt tilt angle adjustment mechanisms symmetrically provided on left and right sides of the robot main body, and crisscross structure-changeable crawler belt assemblies provided on the crawler belt tilt angle adjustment mechanisms. The robot main body is connected to the crisscross structure-changeable crawler belt assemblies at the left and right sides thereof by means of the crawler belt tilt angle adjustment mechanisms. The crawler belt tilt angle adjustment mechanism includes a panel with a rotating shaft, which is connected to the robot main body, and a supporting sliding rail for adjusting a crawler belt tilt angle. A push rod motor is mounted on the supporting sliding rail. A power output shaft of the push rod motor drives a supporting sliding block capable of reciprocating on the supporting sliding rail. A supporting rod is mounted on the supporting sliding block. One end of the supporting rod is connected to the supporting sliding block and the other end thereof is connected to a supporting base on the panel with a rotating shaft. The crisscross structure-changeable crawler belt assembly includes a primary traveling crawler belt, an auxiliary traveling crawler belt, and a crisscross structure-changeable sliding block. Each of the primary traveling crawler belt and the auxiliary traveling crawler belt includes a crawler belt supporting plate, a driving wheel, a driven wheel, a driving motor, and a crawler belt. A sliding rail and a lead screw are mounted in the middle of the crawler belt supporting plate and the lead screw is engaged with a gear of a stepping motor mounted on the crawler belt supporting plate to drive the lead screw to rotate. The crisscross structure-changeable sliding block is composed of two small sliding blocks and a high-torque motor.

In the pipeline inspection robot with crisscross structure-changeable crawler belts, two sets of the supporting sliding rails for adjusting a crawler belt tilt angle are provided, and are centrally symmetrically mounted at the bottom of the robot main body. The panel with a rotating shaft is provided with two crawler belt assembly supporting rods, which are used for mounting the crisscross structure-changeable crawler belt assembly.

In the pipeline inspection robot with crisscross structure-changeable crawler belts, two sets of the crisscross structure-changeable crawler belt assemblies are provided, and are symmetrically mounted on the panels with a rotating shaft of the crawler belt tilt angle adjustment mechanisms at two sides of the robot main body. A bearing is mounted inside the centers of a driving wheel and a driven wheel included in the primary traveling crawler belt, which are mounted and fixed through the bearing and the two crawler belt assembly supporting rods on the panel with a rotating shaft.

In the pipeline inspection robot with crisscross structure-changeable crawler belts, the two sliding blocks included in the crisscross structure-changeable sliding block are mounted on the lead screw in the middle of each of the primary traveling crawler belt and the auxiliary traveling crawler belt respectively. These two small sliding blocks are connected by means of the high-torque motor. The crisscross structure-changeable sliding block can be driven to slide on the lead screw in each of the primary traveling crawler belt and the auxiliary traveling crawler belt respectively, under a driving force of the stepping motor mounted in each of the primary traveling crawler belt and the auxiliary traveling crawler belt.

In the pipeline inspection robot with crisscross structure-changeable crawler belts, the robot main body includes a robot main body panel, a depth camera, battery components, a power supply component, a main control component, a radio component, an inertial measurement unit (IMU) sensor, and a single line laser radar. The single line laser radar is mounted in front of a bottom surface of the robot main body panel. The depth camera is mounted in front of an upper surface of the robot main body panel. The battery components are mounted on the bottom surface of the robot main body panel and at two sides of the supporting sliding rails for adjusting a crawler belt tilt angle. The power supply component, the main control component, the radio component, and the IMU sensor are mounted on the upper surface of the robot main body, and the IMU sensor is mounted in the center of the robot main body.

A control method for adjustment of crawler belt tilt angles of a pipeline inspection robot with crisscross structure-changeable crawler belts, and the method including the following steps:

Step 1: sampling point cloud information outputted by a single line laser radar and calculating an included angle $\theta_L, \theta_R$ between a curvature radius direction of road planes contacting with crawler belts at two sides and an X-axis direction of the robot according to the point cloud information;

Step 2: calculating a distance to be moved $\Delta l$ of a supporting sliding rail for adjusting a tilt angle of the crawler belt at the left side;

$$\Delta l = \begin{cases} l_{init} - \left(\sqrt{l_1^2 - \left(l_2\cos\left(\frac{\pi}{2} - \theta_L\right)\right)^2} - l_2\sin\left(\frac{\pi}{2} - \theta_L\right)\right) & \theta_L < \frac{\pi}{2} \\ l_{init} - \left(\sqrt{l_1^2 - \left(l_2\cos\left(\theta_L - \frac{\pi}{2}\right)\right)^2} - l_2\sin\left(\theta_L - \frac{\pi}{2}\right)\right) & \theta_L > \frac{\pi}{2} \end{cases} \quad (1)$$

where $l_{init}$ is a distance from a panel with a rotating shaft at the left side in a case that the panels with a rotating shaft are vertical to a robot main body panel, i.e., $\theta_L = \pi/2$, $l_1$ is a distance from a supporting base to the rotating shaft, and $l_2$ is a length of a supporting rod;

Step 3: calculating a rotation quantity $\Delta k$ of a push rod motor for adjusting the tilt angle of the crawler belt at the left side;

calculating the rotation count $\Delta k$ of the push rod motor according to $\Delta l$ and a distance $l_o$ for which a supporting sliding block can move in a case of rotating the push rod motor for one circle;

$$\Delta k = \frac{\Delta l}{l_o} \quad (2)$$

$\theta_L > \pi/2$ indicating that the curvature radius direction of the road planes contacting with the crawler belt at the left side is toward the lower right, at this time, $\Delta l < 0$, and the supporting sliding block moves rightward for $|\Delta l|$, the push rod motor rotates clockwise for $\Delta k$ circles and the crawler belt retracts inward; and $\theta_L < \pi/2$ indicating that the curvature radius direction of the road planes contacting with the crawler belt at the left side is toward the upper right, at this time, $\Delta l > 0$, and the supporting sliding block moves leftward for $|\Delta l|$, the push rod motor rotates anticlockwise for $\Delta k$ circles and the crawler belt expands outward;

Step 4: calculating by Step 1 to step 3 to obtain a count $\Delta k$ to be rotated of the push rod motor, determining whether the direction is clockwise or anticlockwise according to a size relationship between $\theta_L$ and $\pi/2$, and selecting a reasonable control algorithm to drive the push rod motor to rotate for a specified count; likewise, for the crawler belt at the right side, calculating by step 1 to step 3 to obtain a movement distance $\Delta l$ of the supporting sliding block at the right side and a rotation count $\Delta k$ of the push rod motor at the right side, and driving the push rod motor at the right side to rotate for a corresponding count; and the rotation counts of the push rod motors at the left and right sides being also different with respect to different curvature radii of the road planes contacting with the crawler belts at the left and right sides, thus enabling the inspection robot to adapt to a terrain with different curvature radii on the same road.

An obstacle-crossing control method of a pipeline inspection robot with crisscross structure-changeable crawler belts, and the method including the following steps:

Step 1: sampling a y-axis direction angle $\phi$ outputted by an IMU sensor, with a sampling frequency of 100 Hz; acquiring data of a depth camera and calculating a distance from a front obstacle l and an obstacle height h;

Step 2: before the inspection robot reaches the obstacle: in a case of $l > l_s$, calculating distances to be moved of crisscross structure-changeable sliding blocks on primary traveling crawler belts and auxiliary traveling crawler belts, namely $\Delta l_f$ and $\Delta l_s$ respectively; and calculating a rotation angle $\varphi$ of high-torque motors; and in a case of $l < l_s$, returning back until $l > l_s$;

$$\varphi = \left(\arccos\left(\frac{h}{l_s}\right) + \frac{\pi}{2}\right) - \varphi_c, \Delta l_f = -l_{fc}, \Delta l_s = -l_{sc} \quad (3)$$

where the length of the primary traveling crawler belts is $l_f$ and the length of the auxiliary traveling crawler belts is $l_s$, and $l_f = l_s$;

Step 3: the left and right primary traveling crawler belts of the inspection robot traveling forward until the left and right auxiliary traveling crawler belts contact with the obstacle, and calculating a forward movement distance $\Delta L_f$ of the left and right primary traveling crawler belts;

$$\Delta L_f = l_s - l_f \cos\left(\arcsin\frac{h}{l_f}\right) \quad (4)$$

Step 4: the inspection robot main body climbing upward, and calculating a distance to be moved $\Delta l_s$ of the crisscross structure-changeable sliding blocks on the auxiliary traveling crawler belts, a rotation angle $\varphi$ of the high-torque motors, and a forward traveling distance $\Delta L_f$ of the left and right primary traveling crawler belts of the inspection robot;

$$\varphi = \frac{\pi}{2} - \arccos\left(\frac{h}{l_s}\right), \Delta l_s = l_s, \Delta L_f = l_s \qquad (5)$$

Step 5: the left and right auxiliary traveling crawler belts of the inspection robot sliding downward to reach the bottom of the inspection robot main body, and calculating a distance to be moved $\Delta l_f$ of the crisscross structure-changeable sliding blocks on the sliding rails of the primary traveling crawler belts and a rotation angle φ of the high-torque motors;

$$\varphi = \frac{\pi}{2} - \arccos\left(\frac{h}{l_s}\right), \Delta l_f = l_f \qquad (6)$$

Step 6: the left and right auxiliary traveling crawler belts of the inspection robot downward supporting the robot main body to be on the same horizontal line above the obstacle; at this time, requiring h< $(l_s - l_f \tan \phi)\cos \phi$; and calculating a distance to be moved $\Delta l_s$ of the crisscross structure-changeable sliding blocks on the auxiliary traveling crawler belts, a rotation angle φ of the high-torque motors, and a forward traveling distance $\Delta L_s$ of the left and right auxiliary traveling crawler belts of the inspection robot;

$$\varphi = \pi - \arccos\left(\frac{h}{l_s}\right),$$

$$\Delta l_s = l_f \tan\phi + \frac{h}{\cos\phi} - l_s, \qquad (7)$$

$$\Delta L_s = \sqrt{l_f^2 - h^2} - h\tan\phi + l_s - \frac{l_f}{\cos\phi}$$

Step 7: the left and right primary traveling crawler belts and auxiliary traveling crawler belts of the inspection robot traveling forward and stopping until the bottoms of the left and right auxiliary traveling crawler belts reach the bottom of the obstacle, and calculating traveling distances $\Delta L_f$ and $\Delta L_s$ of the left and right primary traveling crawler belts and auxiliary traveling crawler belts respectively, and a distance to be moved $\Delta l_s$ of the crisscross structure-changeable sliding blocks on the auxiliary traveling crawler belts;

$$\Delta L_f = l_f, \Delta L_s = \frac{l_f}{\cos\phi}, \Delta l_s = \frac{h}{\cos\phi} - \left(l_f \tan\phi + \frac{h}{\cos\phi}\right) \qquad (8)$$

Step 8: retracting the auxiliary traveling crawler belts, and calculating a distance to be moved $\Delta l_f$ of the crisscross structure-changeable sliding blocks on the sliding rails of the primary traveling crawler belts and a rotation angle φ of the high-torque motors;

$$\Delta l_f = l_f, \varphi = \frac{\pi}{2} \qquad (9)$$

Step 9: selecting a suitable control algorithm under a specified state to perform the rotation angles φ of the high-torque motors and distances such as the distances to be moved $\Delta l_s$ of the crisscross structure-changeable sliding blocks on the sliding rails of the auxiliary traveling crawler belts, which are calculated in step 1 to step 8 above.

Beneficial Effects of the Present Disclosure

1. In the present disclosure, the panels with a rotating shaft are connected to the robot main body panel, two sets of the supporting sliding rails for adjusting a crawler belt tilt angle are mounted at the bottom of the robot main body panel, and the supporting sliding blocks connected to the panels with a rotating shaft through the supporting rods are mounted on the supporting sliding rails. The supporting sliding blocks reciprocate to implement the adjustment of the crawler belt tilt angles. Each set of the crawler belt tilt angle adjustment mechanism is controlled independently to adapt to the terrain with different curvature radii on the same road.
2. In the present disclosure, the single line laser radar is mounted in front of the bottom surface of the robot main body panel, the curvature radii of the road planes contacting with the crawler belts at the two sides are calculated according to the point cloud information outputted by the single line laser radar, moreover, in combination with the control method for adjustment of crawler belt tilt angles, adaptive adjustment of the crawler belt tilt angles can be implemented.
3. In the present disclosure, two ends of the robot main body are connected to the mounted crisscross structure-changeable crawler belts by means of the crawler belt tilt angle adjustment mechanisms. The sliding rails and the lead screws are both mounted inside the primary traveling crawler belt and the auxiliary traveling crawler belt in each set of the crisscross structure-changeable crawler belt. The primary traveling crawler belts and the auxiliary traveling crawler belts are connected by means of the crisscross structure-changeable sliding blocks. The high-torque motors included the crisscross structure-changeable sliding blocks can enable the auxiliary traveling crawler belts to rotate for 360 degrees in a case that the primary traveling crawler belts and the crawler belt tilt angle adjustment mechanisms are fixed. The rotation of the auxiliary traveling crawler belts can be used for supporting the robot main body to cross over obstacles.
4. In the present disclosure, the depth camera mounted in front of the robot can implement the acquisition of distance and height information of the front obstacle and the IMU sensor mounted at the center of the robot main body can implement the acquisition of road gradient information. Moreover, in combination with the obstacle-crossing control method, crossing over the obstacles on grounds with different gradients can be implemented.
5. In the present disclosure, the driving wheels are mounted on the primary traveling crawler belts and the auxiliary traveling crawler belts respectively, to ensure that the driving capability of the crawler belts can still be ensured in a case of structural changes.

LIST OF IDENTIFICATION NUMBER IN THE DRAWINGS

1: robot main body; 11: robot main body panel; 12: depth camera; 13: power supply component 14: main control component; 15: IMU sensor; 16: radio component; 17: single line laser radar; 18: battery component; 2: crawler belt tilt angle adjustment mechanism; 21: panel with a rotating shaft; 22: supporting rod; 23: supporting sliding block; 24: supporting sliding rail; 25: push rod motor; 211: supporting base; 212: crawler belt assembly supporting rod; 3: crisscross structure-changeable crawler belt assembly; 31: primary traveling crawler belt; 32: auxiliary traveling crawler belt; 33: crisscross structure-changeable sliding block; 311: driving wheel; 312: driven wheel; 313: crawler belt supporting plate; 314: crawler belt; 315: driving motor; 331: high-torque motor; 332: small sliding block; 3131: stepping motor; 3132: lead screw.

Detailed Description

The present disclosure will be further described in conjunction with reference to the accompanying drawings and specific implementations. It should be understood that the following specific implementations are only intended to illustrate the present disclosure and not to limit the scope of the present disclosure.

Figure 1:
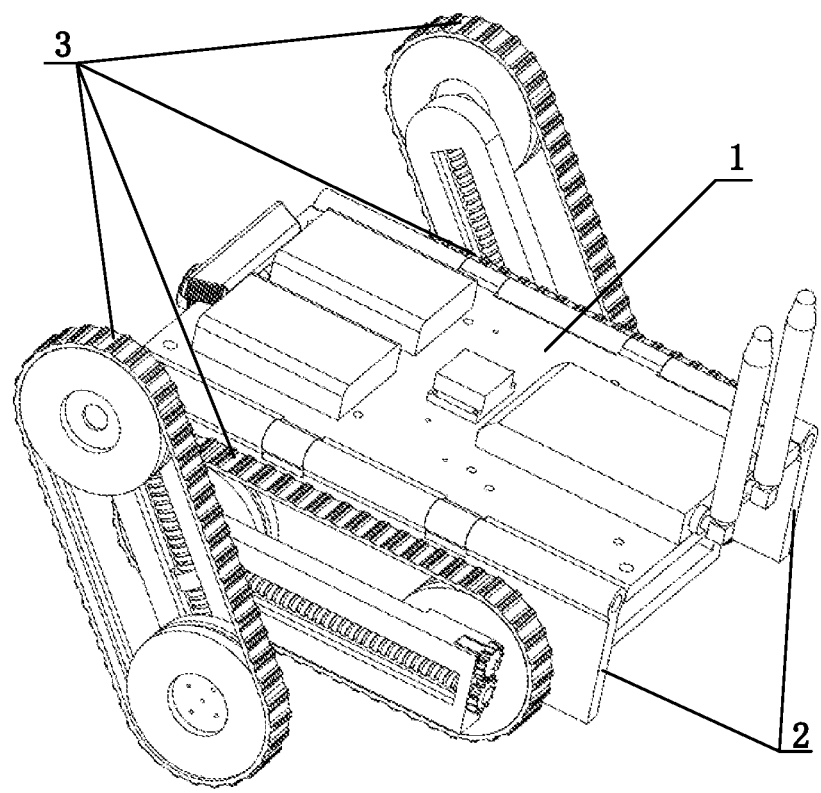
FIG. 1 is a side view of mechanism of a pipeline inspection robot with crisscross structure-changeable crawler belts of the present disclosure.
Figure 2:
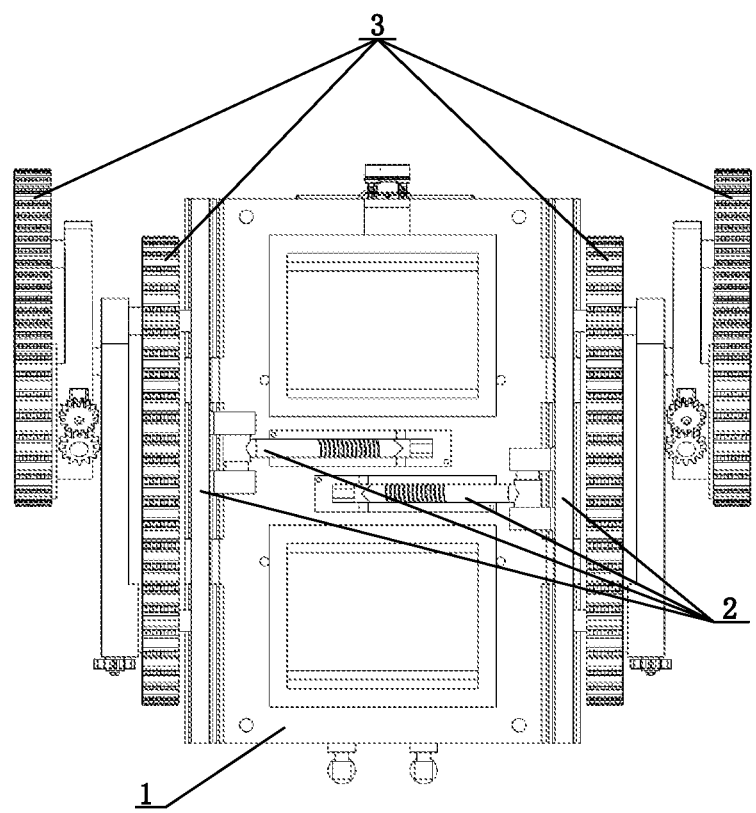
FIG. 2 is a schematic diagram of mechanism of the bottom of a pipeline inspection robot with crisscross structure-changeable crawler belts of the present disclosure.
Figure 3:
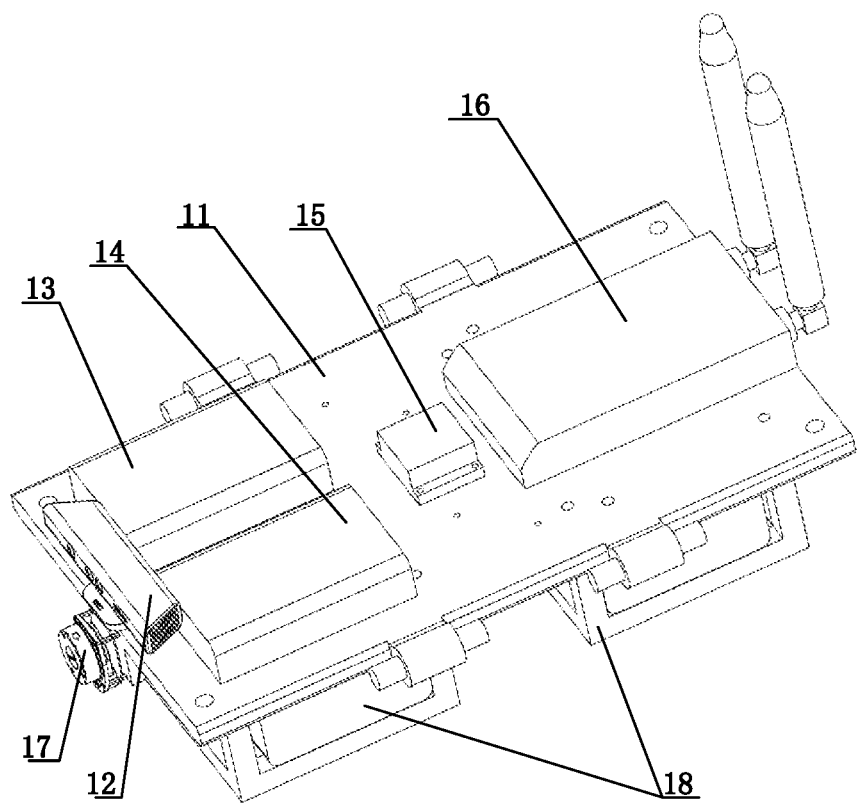
FIG. 3 is a schematic diagram of mechanism of a robot main body.
Figure 4:
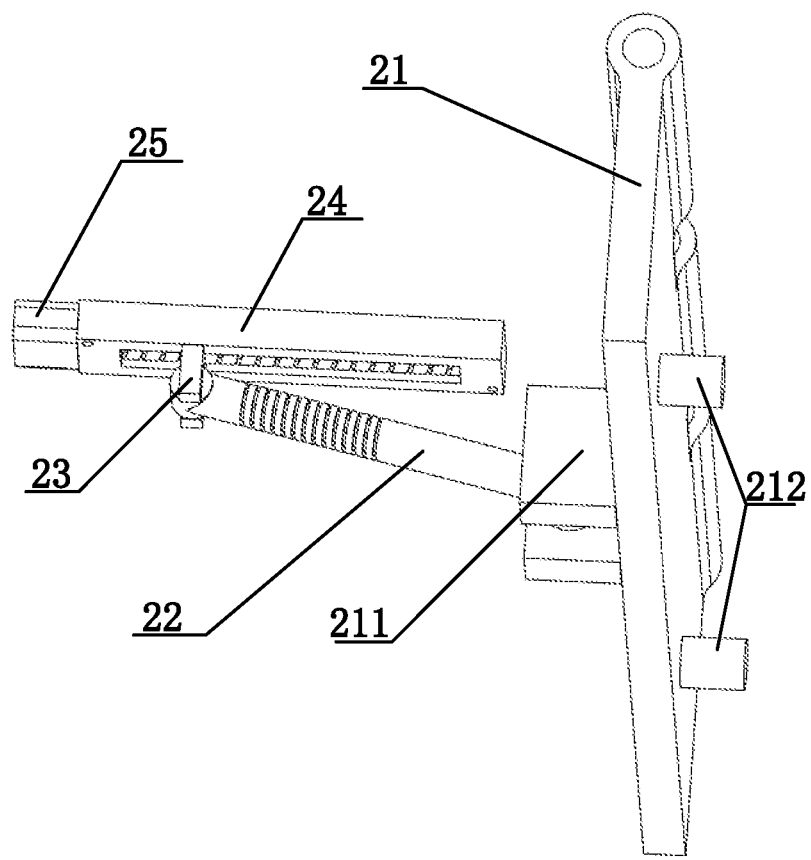
FIG. 4 is a schematic diagram of a crawler belt tilt angle adjustment mechanism.
Figure 5:
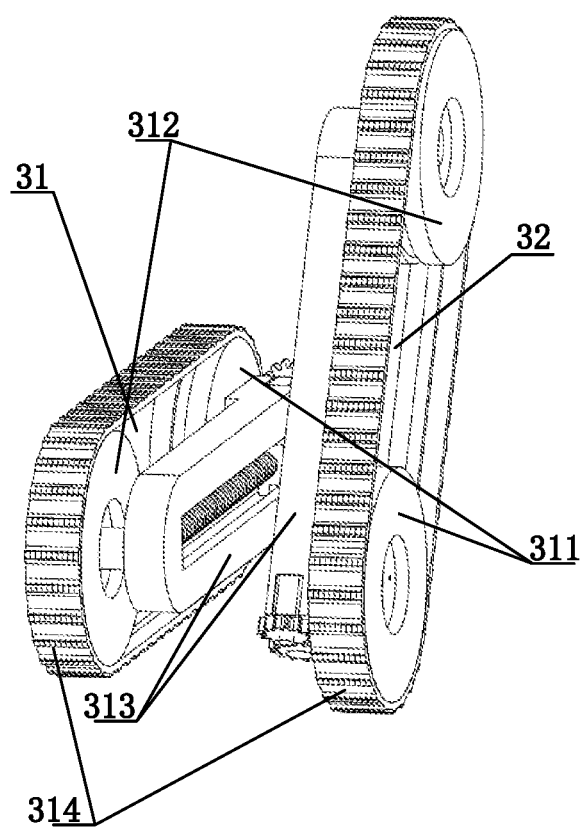
FIG. 5 is a schematic diagram of mechanism of a crisscross structure-changeable crawler belt assembly.
Figure 6:
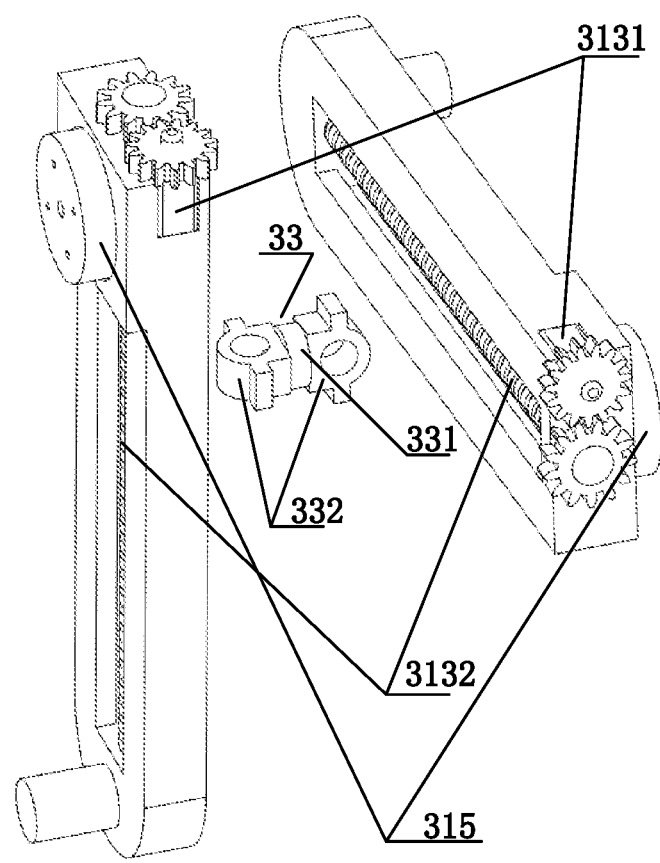
FIG. 6 is an internal exploded view of a crisscross structure-changeable crawler belt assembly.
Figure 7:
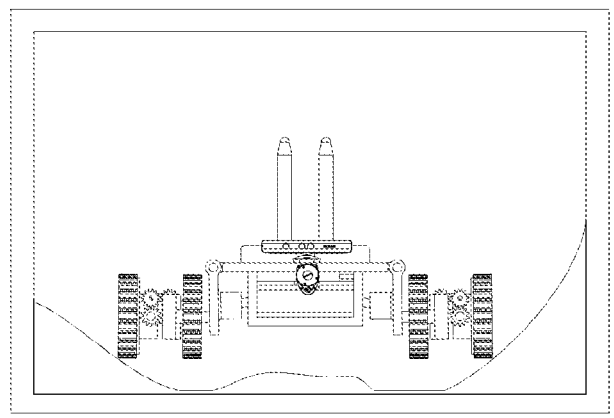
FIG. 7 is a state schematic diagram of an inspection robot in a pipeline before adjustment of crawler belt tilt angles.
Figure 8:
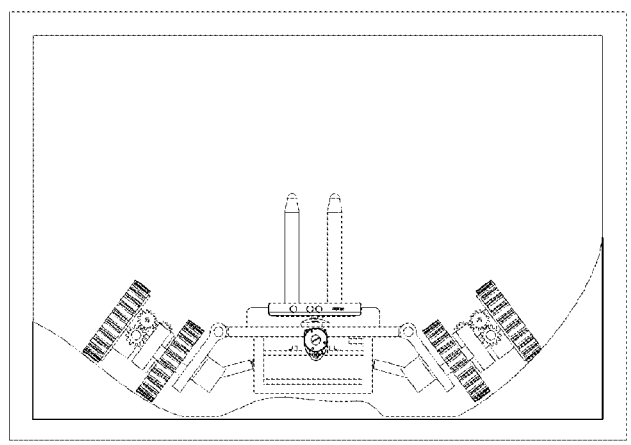
FIG. 8 is a state schematic diagram of an inspection robot in a pipeline after adjustment of crawler belt tilt angles.
Figure 9:
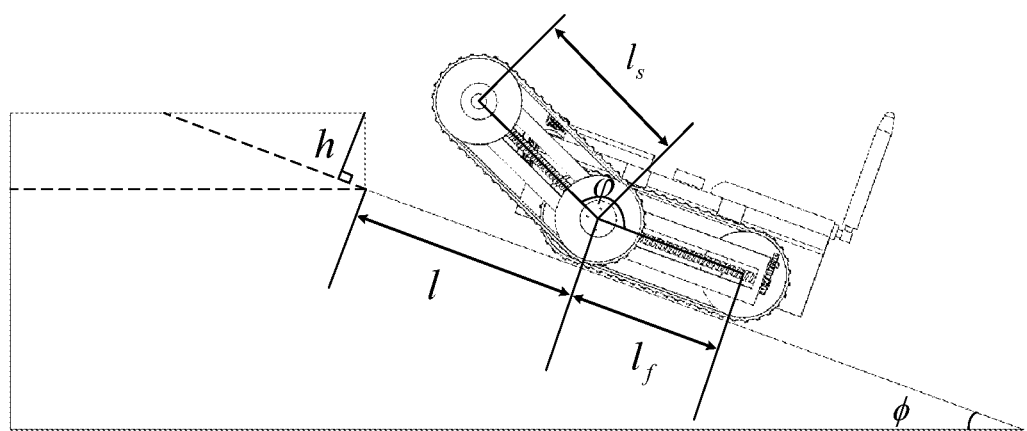
FIG. 9 is distances from a primary traveling crawler belt, an auxiliary traveling crawler belt, and a front end of the primary traveling crawler belt of an inspection robot to an obstacle, an obstacle height measured by a binocular camera, a slope angle of a traveling road surface of the inspection robot, and an included angle between the primary traveling crawler belt and the auxiliary traveling crawler belt.
Figure 10:
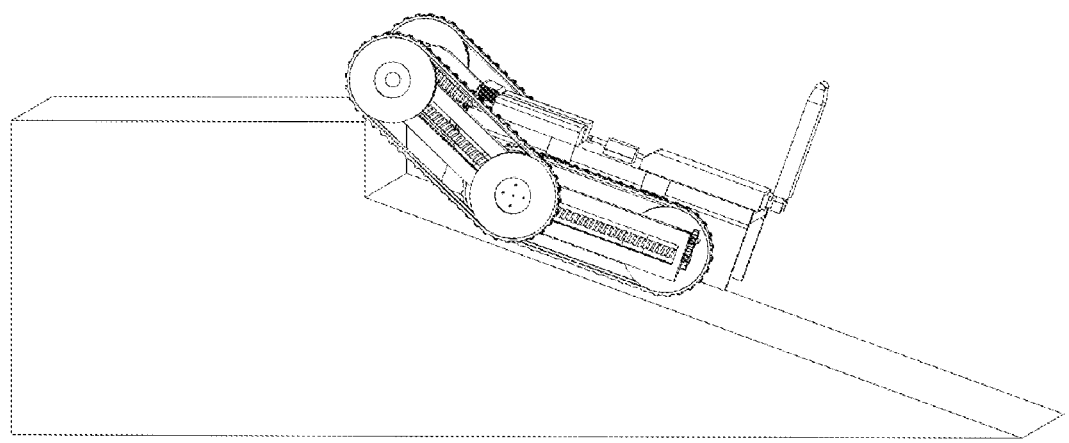
FIG. 10 is a schematic diagram when left and right auxiliary traveling crawler belts of an inspection robot contact with an obstacle.
Figure 11:
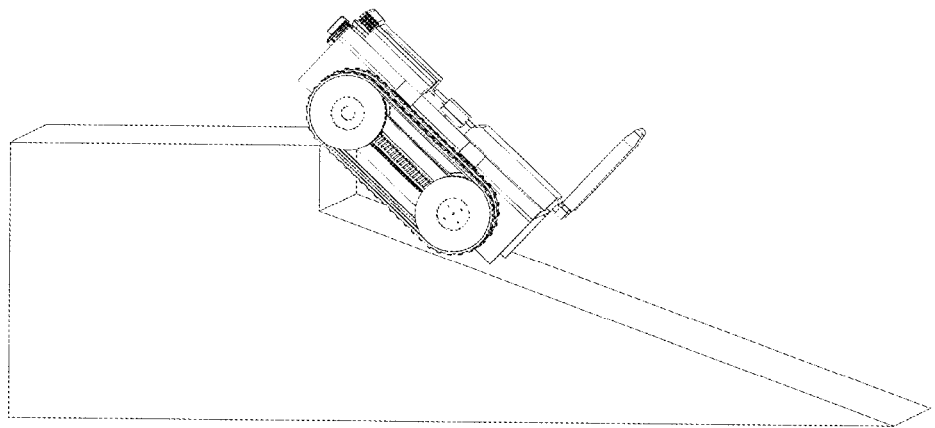
FIG. 11 is a schematic diagram when an inspection robot main body climbs upward until primary traveling crawler belts contact with an obstacle.
Figure 12:
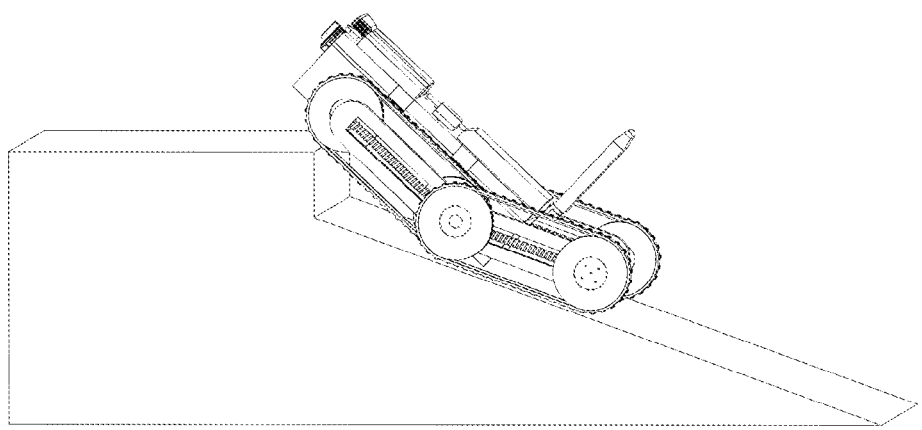
FIG. 12 is a schematic diagram when left and right auxiliary traveling crawler belts of an inspection robot slide downward to reach the bottom of an inspection robot main body.
Figure 13:
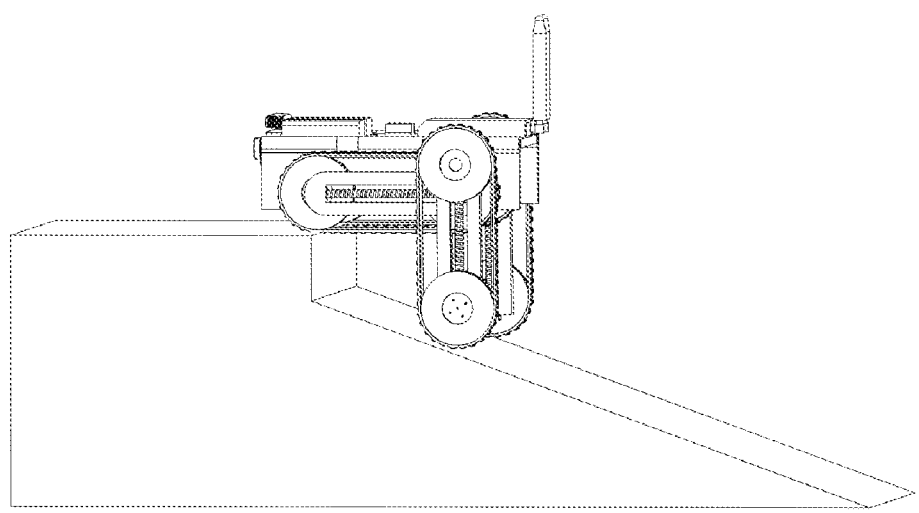
FIG. 13 is a schematic diagram when left and right auxiliary traveling crawler belts of an inspection robot downward support a robot main body to be on the same horizontal line above an obstacle.
Figure 14:
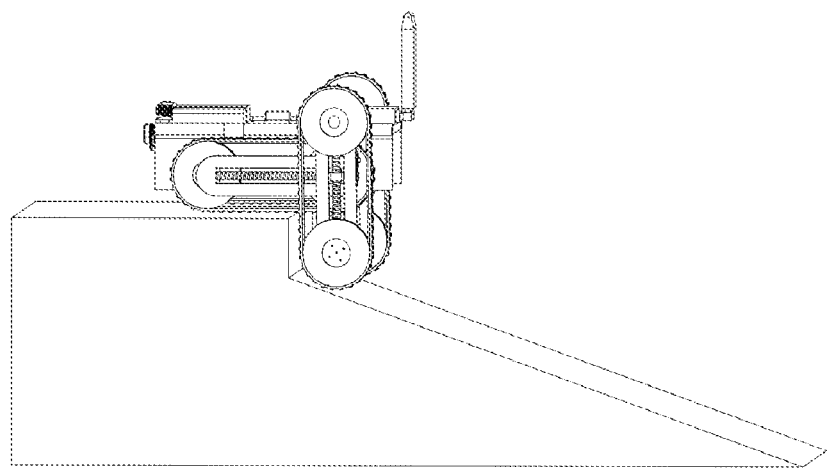
FIG. 14 is a schematic diagram when left and right primary traveling crawler belts and auxiliary traveling crawler belts of an inspection robot travel forward and stop until the bottoms of the left and right auxiliary traveling crawler belts reach the bottom of an obstacle.
Figure 15:
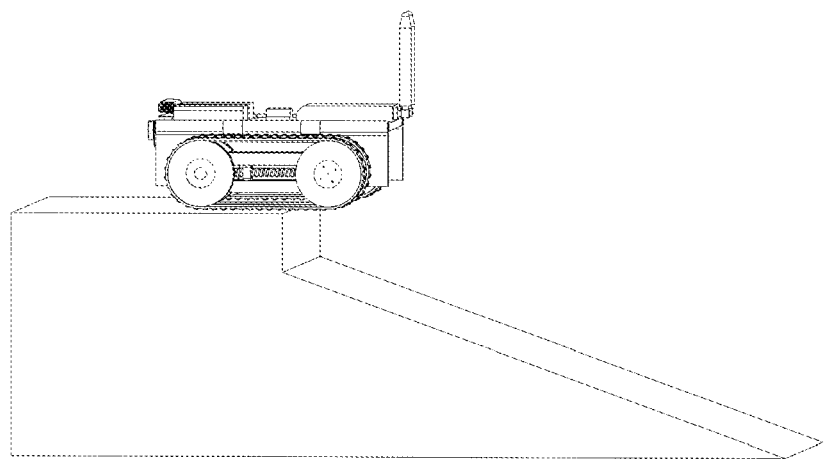
FIG. 15 is a schematic diagram when auxiliary traveling crawler belts are retracted after an inspection robot climbs upward to be above an obstacle.
Figure 16:
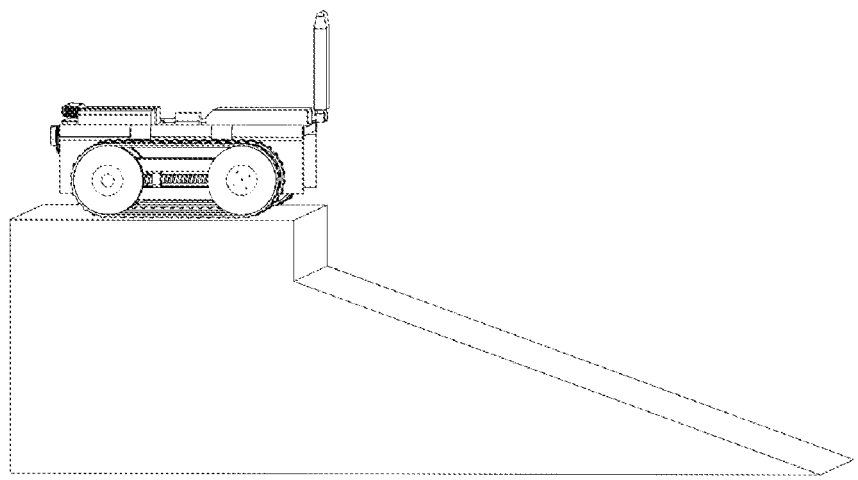
FIG. 16 is a schematic diagram when an inspection robot completely crosses over an obstacle.

As shown in FIG. 1 and FIG. 2, an inspection robot with crisscross structure-changeable crawler belts includes a robot main body 1, crawler belt tilt angle adjustment mechanisms 2 symmetrically provided on left and right sides of the robot main body, and crisscross structure-changeable crawler belt assemblies 3 provided on the crawler belt tilt angle adjustment mechanisms. The robot main body is connected to the crisscross structure-changeable crawler belt assemblies at the left and right sides thereof by means of the crawler belt tilt angle adjustment mechanisms. The crawler belt tilt angle adjustment mechanism includes a panel with a rotating shaft 21, which is connected to the robot main body, and a supporting sliding rail 24 for adjusting a crawler belt tilt angle. A push rod motor 25 is mounted on the supporting sliding rail. A power output shaft of the push rod motor drives a supporting sliding block 23 capable of reciprocating on the supporting sliding rail. A supporting rod 22 is mounted on the supporting sliding block. One end of the supporting rod is connected to the supporting sliding block and the other end thereof is connected to a supporting base 211 on the panel with a rotating shaft. The crisscross structure-changeable crawler belt assembly includes a primary traveling crawler belt 31, an auxiliary traveling crawler belt 32, and a crisscross structure-changeable sliding block 33. Each of the primary traveling crawler belt and the auxiliary traveling crawler belt includes a crawler belt supporting plate 313, a driving wheel 311, a driven wheel 312, a driving motor 315, and a crawler belt 314. A sliding rail and a lead screw 3132 are mounted in the middle of the crawler belt supporting plate and the lead screw is engaged with a gear of a stepping motor 3131 mounted on the crawler belt supporting plate to drive the lead screw to rotate. The crisscross structure-changeable sliding block is composed of two small sliding blocks 332 and a high-torque motor 331.

Two sets of the supporting sliding rails 24 for adjusting a crawler belt tilt angle are provided, and are centrally symmetrically mounted at the bottom of the robot main body. The panel with a rotating shaft 21 is provided with two crawler belt assembly supporting rods 212, which are used for mounting the crisscross structure-changeable crawler belt assembly.

Two sets of the crisscross structure-changeable crawler belt assemblies 3 are provided, and are symmetrically mounted on the panels 21 with a rotating shaft of the crawler belt tilt angle adjustment mechanisms at two sides of the robot main body. A bearing is mounted inside the centers of a driving wheel and a driven wheel included in the primary traveling crawler belt 31, which are mounted and fixed through the bearing and the two crawler belt assembly supporting rods on the panel with a rotating shaft.

The two sliding blocks 332 included in the crisscross structure-changeable sliding block are mounted on the lead screw 3132 in the middle of each of the primary traveling crawler belt and the auxiliary traveling crawler belt respectively. These two small sliding blocks 332 are connected by means of the high-torque motor 331. The crisscross structure-changeable sliding block 33 can be driven to slide on the lead screw 3132 in each of the primary traveling crawler belt and the auxiliary traveling crawler belt respectively, under a driving force of the stepping motor mounted in each of the primary traveling crawler belt 31 and the auxiliary traveling crawler belt 32.

The robot main body includes a robot main body panel 11, a depth camera 12, battery components 18, a power supply component 13, a main control component 14, a radio component 16, an IMU sensor 15, and a single line laser radar 17. The single line laser radar is mounted in front of a bottom surface of the robot main body panel. The depth camera is mounted in front of an upper surface of the robot main body panel. The battery components are mounted on the bottom surface of the robot main body panel and at two sides of the supporting sliding rails for adjusting a crawler belt tilt angle. The power supply component, the main control component, the radio component and the IMU sensor are mounted on the upper surface of the robot main body, and the IMU sensor is mounted in the center of the robot main body.

A control method for adjustment of crawler belt tilt angles of a pipeline inspection robot with crisscross structure-changeable crawler belts, and the method including the following steps:

Step 1: Sample point cloud information outputted by a single line laser radar and calculate an included angle $\theta_L, \theta_R$ between a curvature radius direction of road planes contacting with crawler belts at two sides and an X-axis direction of the robot according to the point cloud information.

Step 2: Calculate a distance to be moved $\Delta l$ of a supporting sliding rail for adjusting a tilt angle of the crawler belt at the left side;

$$\Delta l = \begin{cases} l_{init} - \left(\sqrt{l_1^2 - \left(l_2\cos\left(\frac{\pi}{2} - \theta_L\right)\right)^2} - l_2\sin\left(\frac{\pi}{2} - \theta_L\right)\right) & \theta_L < \frac{\pi}{2} \\ l_{init} - \left(\sqrt{l_1^2 - \left(l_2\cos\left(\theta_L - \frac{\pi}{2}\right)\right)^2} - l_2\sin\left(\theta_L - \frac{\pi}{2}\right)\right) & \theta_L > \frac{\pi}{2} \end{cases} \quad (1)$$

where $l_{init}$ is a distance from a panel with a rotating shaft at the left side in a case that the panels with a rotating shaft are vertical to a robot main body panel, i.e., $\theta_L = \pi/2$, $l_1$ is a distance from a supporting base to the rotating shaft, and $l_2$ is a length of a supporting rod.

Step 3: Calculate a rotation count $\Delta k$ of a push rod motor for adjusting the tilt angle of the crawler belt at the left side.

Calculate the rotation count $\Delta k$ of the push rod motor according to $\Delta l$ and a distance $l_o$ for which a supporting sliding block can move in a case of rotating the push rod motor for one circle.

$$\Delta k = \frac{\Delta l}{l_o} \quad (2)$$

$\theta_L > \pi/2$ indicating that the curvature radius direction of the road planes contacting with the crawler belt at the left side is toward the lower right, at this time, $\Delta l < 0$, and the supporting sliding block moves rightward for $|\Delta l|$, the push rod motor rotates clockwise for $\Delta k$ circles and the crawler belt retracts inward; and $\theta_L < \pi/2$ indicating that the curvature radius direction of the road planes contacting with the crawler belt at the left side is toward the upper right, at this time, $\Delta l > 0$, and the supporting sliding block moves leftward for $|\Delta l|$, the push rod motor rotates anticlockwise for $\Delta k$ circles and the crawler belt expands outward.

Step 4: Calculate by step 1 to step 3 to obtain a count $\Delta k$ to be rotated of the push rod motor, determine whether the direction is clockwise or anticlockwise according to a size relationship between $\theta_L$ and $\pi/2$, and select a reasonable control algorithm to drive the push rod motor to rotate for a specified count; likewise, for the crawler belt at the right side, calculate by step 1 to step 3 to obtain a movement distance $\Delta l$ of the supporting sliding block at the right side and a rotation count $\Delta k$ of the push rod motor at the right side, and drive the push rod motor at the right side to rotate for a corresponding count; and the rotation counts of the push rod motors at the left and right sides being also different with respect to different curvature radii of the road planes contacting with the crawler belts at the left and right sides, thus enabling the inspection robot to adapt to a terrain with different plane curvature radii on the same road.

An obstacle-crossing control method of a pipeline inspection robot with crisscross structure-changeable crawler belts, and the method including the following steps:

Step 1: Sample a y-axis direction angle $\phi$ outputted by an IMU sensor, with a sampling frequency of 100 Hz. Acquire data of a depth camera and calculate a distance from a front obstacle 1 and an obstacle height h.

Step 2: Before the inspection robot reaches the obstacle: in a case of $l > l_s$, calculate distances to be moved of crisscross structure-changeable sliding blocks on primary traveling crawler belts and auxiliary traveling crawler belts, namely $\Delta l_f$ and $\Delta l_s$ respectively, and calculate a rotation angle $\varphi$ of high-torque motors; and in a case of $l < l_s$, return back until $l > l_s$.

$$\varphi = \left(\arccos\left(\frac{h}{l_s}\right) + \frac{\pi}{2}\right) - \varphi_c, \Delta l_f = -l_{fc}, \Delta l_s = -l_{sc} \quad (3)$$

where the length of the primary traveling crawler belts is $l_f$ and the length of the auxiliary traveling crawler belts is $l_s$, and $l_f = l_s$; in a case of $\Delta l_f > 0$, the crisscross structure-changeable sliding blocks slide on the sliding rails of the primary traveling crawler belts in a direction far away from driven wheels on the primary traveling crawler belts; in a case of $\Delta l_f < 0$, the structure-changeable sliding blocks slide on the sliding rails of the primary traveling crawler belts in a direction approaching to the driven wheels on the primary traveling crawler belts; in a case of $\Delta l_s > 0$, the crisscross structure-changeable sliding blocks slide on the sliding rails of the auxiliary traveling crawler belts in a direction far away from driving wheels on the auxiliary traveling crawler belts; in a case of $\Delta l_s < 0$, the crisscross structure-changeable sliding blocks slide on the sliding rails of the auxiliary traveling crawler belts in a direction approaching to the driving wheels on the auxiliary traveling crawler belts; and $l_{fc}$ indicates a distance from current positions of the crisscross structure-changeable sliding blocks on the primary traveling crawler belts to the driven wheels on the primary traveling crawler belts and $l_{sc}$ indicates a distance from current positions of the crisscross structure-changeable sliding blocks on the auxiliary traveling crawler belts to the driving wheels on the auxiliary traveling crawler belts.

Step 3: The left and right primary traveling crawler belts of the inspection robot traveling forward until the left and right auxiliary traveling crawler belts contact with the obstacle, and calculate a forward movement distance $\Delta L_f$ of the left and right primary traveling crawler belts.

$$\Delta L_f = l_s - l_f \cos\left(\arcsin\frac{h}{l_f}\right) \quad (4)$$

Step 4: The inspection robot main body climbing upward, and calculate a distance to be moved $\Delta l_s$ of the crisscross structure-changeable sliding blocks on the auxiliary traveling crawler belts, a rotation angle $\varphi$ of the high-torque motors, and a forward traveling distance $\Delta L_f$ of the left and right primary traveling crawler belts of the inspection robot.

$$\varphi = \frac{\pi}{2} - \arccos\left(\frac{h}{l_s}\right), \Delta l_s = l_s, \Delta L_f = l_s \quad (5)$$

Step 5: The left and right auxiliary traveling crawler belts of the inspection robot sliding downward to reach the bottom of the inspection robot main body, and calculate a distance to be moved $\Delta l_f$ of the crisscross structure-changeable sliding blocks on the sliding rails of the primary traveling crawler belts and a rotation angle $\varphi$ of the high-torque motors.

$$\varphi = \frac{\pi}{2} - \arccos\left(\frac{h}{l_s}\right), \Delta l_f = l_f \quad (6)$$

Step 6: The left and right auxiliary traveling crawler belts of the inspection robot downward supporting the robot main body to be on the same horizontal line above the obstacle; at this time, require $h < (l_s - l_f \tan\phi)\cos\phi$; and calculate a distance to be moved $\Delta l_s$ of the crisscross structure-changeable sliding blocks on the auxiliary traveling crawler belts, a rotation angle $\varphi$ of the high-torque motors, and a forward traveling distance $\Delta L_s$ of the left and right auxiliary traveling crawler belts of the inspection robot.

$$\varphi = \pi - \arccos\left(\frac{h}{l_s}\right), \quad (7)$$
$$\Delta l_s = l_f \tan\phi + \frac{h}{\cos\phi} - l_s,$$
$$\Delta L_s = \sqrt{l_f^2 - h^2} - h\tan\phi + l_s - \frac{l_f}{\cos\phi}$$

Step 7: The left and right primary traveling crawler belts and auxiliary traveling crawler belts of the inspection robot traveling forward and stopping until the bottoms of the left and right auxiliary traveling crawler belts reach the bottom of the obstacle, and calculate traveling distances $\Delta L_f$ and $\Delta L_s$ of the left and right primary traveling crawler belts and auxiliary traveling crawler belts respectively, and a distance to be moved $\Delta l_s$ of the crisscross structure-changeable sliding blocks on the auxiliary traveling crawler belts.

$$\Delta L_f = l_f, \Delta L_s = \frac{l_f}{\cos\phi}, \Delta l_s = \frac{h}{\cos\phi} - \left(l_f \tan\phi + \frac{h}{\cos\phi}\right) \quad (8)$$

Step 8: Retract the auxiliary traveling crawler belts, and calculate a distance to be moved $\Delta l_f$ of the crisscross structure-changeable sliding blocks on the sliding rails of the primary traveling crawler belts and a rotation angle $\varphi$ of the high-torque motors.

$$\Delta l_f = l_f, \varphi = \frac{\pi}{2} \quad (9)$$

Step 9: Step 1 to step 8 above being all steps for the robot to cross over the obstacle on a ground with a ground gradient of $\tan(\phi)$, and select a suitable control algorithm under a specified state to perform the rotation angles $\varphi$ of the high-torque motors and the distances, which are calculated in each step.

By adopting the control method for adjustment of crawler belt tilt angles and the obstacle-crossing control method, the pipeline inspection robot can adapt to different types of pipelines and cross over accumulated impurities inside the pipelines, thus effectively improving the efficiency of pipeline inspection.

It should be noted that the content above merely illustrates the concept of the present disclosure, and cannot be used to limit the protection scope of the present disclosure. A person of ordinary skill in the art can make several improvements and modifications without departing from the principle of the present disclosure, and such improvements and modifications should be deemed as falling within the protection scope of the present disclosure.

What is claimed is:

1. A pipeline inspection robot with crisscross structure-changeable crawler belts, comprising a robot main body, crawler belt tilt angle adjustment mechanisms symmetrically provided on left and right sides of the robot main body, and crisscross structure-changeable crawler belt assemblies provided on the crawler belt tilt angle adjustment mechanism; wherein the robot main body is connected to the crisscross structure-changeable crawler belt assemblies at the left and right sides thereof by means of the crawler belt tilt angle adjustment mechanisms; the crawler belt tilt angle adjustment mechanism comprises a panel with a rotating shaft, which is connected to the robot main body, and a supporting sliding rail for adjusting a crawler belt tilt angle; a push rod motor is mounted on the supporting sliding rail; a power output shaft of the push rod motor drives a supporting sliding block capable of reciprocating on the supporting sliding rail; a supporting rod is mounted on the supporting sliding block; one end of the supporting rod is connected to the supporting sliding block and the other end thereof is connected to a supporting base on the panel with a rotating shaft; each crisscross structure-changeable crawler belt assembly comprises a primary traveling crawler belt, an auxiliary traveling crawler belt, and a crisscross structure-changeable sliding block; each of the primary traveling crawler belt and the auxiliary traveling crawler belt comprises a crawler belt supporting plate, a driving wheel, a driven wheel, a driving motor, and a crawler belt; a sliding rail and a lead screw are mounted in the middle of the crawler belt supporting plate and the lead screw is engaged with a gear of a stepping motor mounted on the crawler belt supporting plate to drive the lead screw to rotate; and the crisscross structure-changeable sliding block is composed of two sliding blocks and a torque motor.

2. The pipeline inspection robot with crisscross structure-changeable crawler belts according to claim 1, wherein two sets of the supporting sliding rails for adjusting a crawler belt tilt angle are provided, and are centrally symmetrically mounted at the bottom of the robot main body; and the panel with a rotating shaft is provided with two crawler belt assembly supporting rods, which are used for mounting the crisscross structure-changeable crawler belt assemblies.

3. The pipeline inspection robot with crisscross structure-changeable crawler belts according to claim 2, wherein the two sliding blocks comprised in the crisscross structure-changeable sliding block are mounted on the lead screw in the middle of each of the primary traveling crawler belt and the auxiliary traveling crawler belt respectively; the two sliding blocks of the crisscross structure-changeable sliding block are connected by means of the torque motor; and the crisscross structure-changeable sliding block is driven to slide on the lead screw in each of the primary traveling crawler belt and the auxiliary traveling crawler belt respectively, under a driving force of the stepping motor mounted in each of the primary traveling crawler belt and the auxiliary traveling crawler belt.

4. The pipeline inspection robot with crisscross structure-changeable crawler belts according to claim 1, wherein two sets of the crisscross structure-changeable crawler belt assemblies are provided, and are symmetrically mounted on the panels with a rotating shaft of the crawler belt tilt angle adjustment mechanisms at two sides of the robot main body; and a bearing is mounted inside the centers of a driving wheel and a driven wheel comprised in the primary traveling crawler belt, which are mounted and fixed through the bearing and the two crawler belt assembly supporting rods on the panel with a rotating shaft.

5. The pipeline inspection robot with crisscross structure-changeable crawler belts according to claim 1, wherein the robot main body comprises a robot main body panel, a depth camera, battery components, a power supply component, a main control component, a radio component, an inertial measurement unit (IMU) sensor, and a single line laser radar; the single line laser radar is mounted in front of a bottom surface of the robot main body panel; the depth camera is mounted in front of an upper surface of the robot main body panel; the battery components are mounted on the bottom surface of the robot main body panel and at two sides of the supporting sliding rails for adjusting a crawler belt tilt angle; and the power supply component, the main control component, the radio component and the IMU sensor are mounted on the upper surface of the robot main body, and the IMU sensor is mounted in the center of the robot main body.

* * * * *